(12) United States Patent
Croak et al.

(10) Patent No.: US 8,358,760 B2
(45) Date of Patent: Jan. 22, 2013

(54) METHOD AND APPARATUS FOR ENABLING PHONE NUMBER DIALING USING EMAIL ADDRESSES

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1484 days.

(21) Appl. No.: 11/025,442

(22) Filed: Dec. 29, 2004

(65) Prior Publication Data

US 2006/0153162 A1 Jul. 13, 2006

(51) Int. Cl.
*H04M 3/42* (2006.01)
(52) U.S. Cl. ........... 379/201.01; 379/93.24; 379/201.02; 379/221.14
(58) Field of Classification Search ............... 379/93.24, 379/201.01, 201, 221.14
See application file for complete search history.

(56) References Cited

U.S. PATENT DOCUMENTS

| | | | | |
|---|---|---|---|---|
| 6,580,790 B1* | 6/2003 | Henry et al. | ............. | 379/201.01 |
| 6,754,317 B1* | 6/2004 | Berthoud et al. | .......... | 379/93.24 |
| 2004/0024829 A1* | 2/2004 | Tanimoto | ...................... | 709/206 |
| 2004/0097188 A1* | 5/2004 | Tanimoto | ...................... | 455/3.06 |
| 2005/0125466 A1* | 6/2005 | Tsujimoto | ..................... | 707/204 |
| 2006/0021013 A1* | 1/2006 | Kinoshita | ......................... | 726/6 |
| 2006/0121880 A1* | 6/2006 | Cowsar et al. | ................ | 455/406 |

OTHER PUBLICATIONS

CA Office Action for 2,531,310, Aug. 6, 2008, pp. 1-3.

* cited by examiner

*Primary Examiner* — Ahmad Matar
*Assistant Examiner* — Khai N Nguyen

(57) ABSTRACT

The invention comprises a method and apparatus for enabling a subscriber to establish a call to at least one destination phone number using an email address. Specifically, the method comprises receiving an incoming communication request from the subscriber for establishing the call (where the incoming communication request comprises an email address), determining at least one destination phone number associated with the email address, and processing the call using at least one of the at least one destination phone number associated with the email address.

20 Claims, 4 Drawing Sheets

US 8,358,760 B2

METHOD AND APPARATUS FOR ENABLING PHONE NUMBER DIALING USING EMAIL ADDRESSES

The present invention relates generally to communication networks and, more particularly, to a method and apparatus for enabling network based phone number dialing using email addresses.

BACKGROUND OF THE INVENTION

Many people have numerous telephony devices that are reachable by distinct phone numbers. These include a home phone, an office phone, a home office phone, a cellular phone, a cellular phone integrated with Personal Digital Assistant (PDA), a car phone, a pager, a facsimile, and the like. A person can be reached at different phone numbers depending on where the person is. As such, a caller often needs to remember several numbers owned by the same person, and dial at least a portion of the several numbers, before the person can be reached. In general, callers are often able to remember an email address associated with a person more easily than remembering a plurality of phone numbers associated with a person.

Accordingly, a need exists for a method and apparatus for enabling a subscriber to establish a call to at least one destination phone number using an email address.

SUMMARY OF THE INVENTION

In one embodiment, the invention comprises a method and apparatus for enabling a subscriber to establish a call to at least one destination phone number using an email address. Specifically, the method comprises receiving an incoming communication request from the subscriber for establishing the call (where the incoming communication request comprises an email address), determining at least one destination phone number associated with the email address, and processing the call using at least one of the at least one destination phone number associated with the email address.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
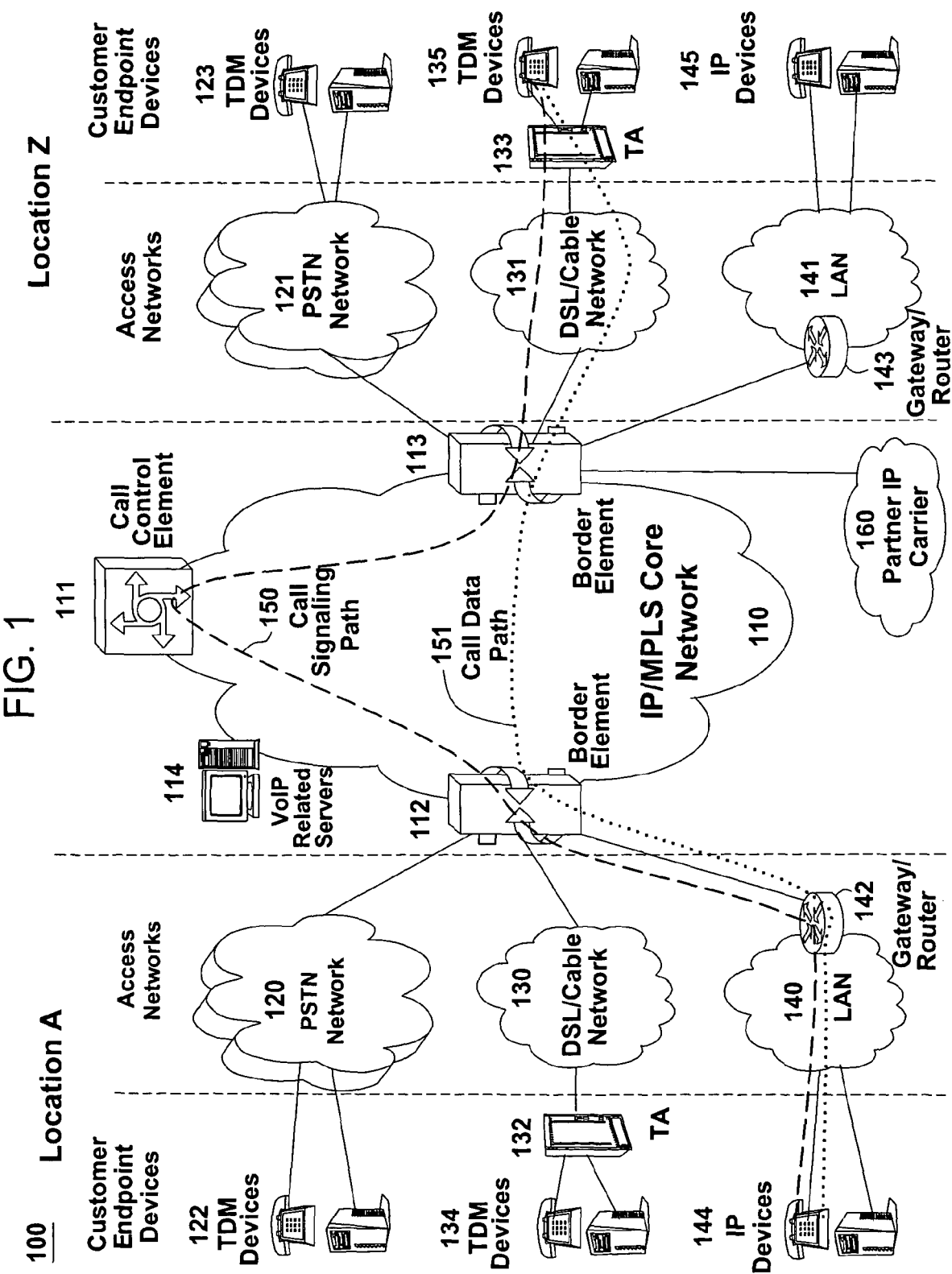
FIG. 1 illustrates a Voice over Internet Protocol (VOIP) network model related to the present invention.

To better understand the present invention, FIG. 1 illustrates an example network, e.g., a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise TDM phones or Private Branch Exchanges (PBXs). IP based customer endpoint devices 144 and 145 typically comprise IP phones or IP PBXs. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises several key VoIP components, such as Border Elements (BEs) 112 and 113, Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call, CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, an call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
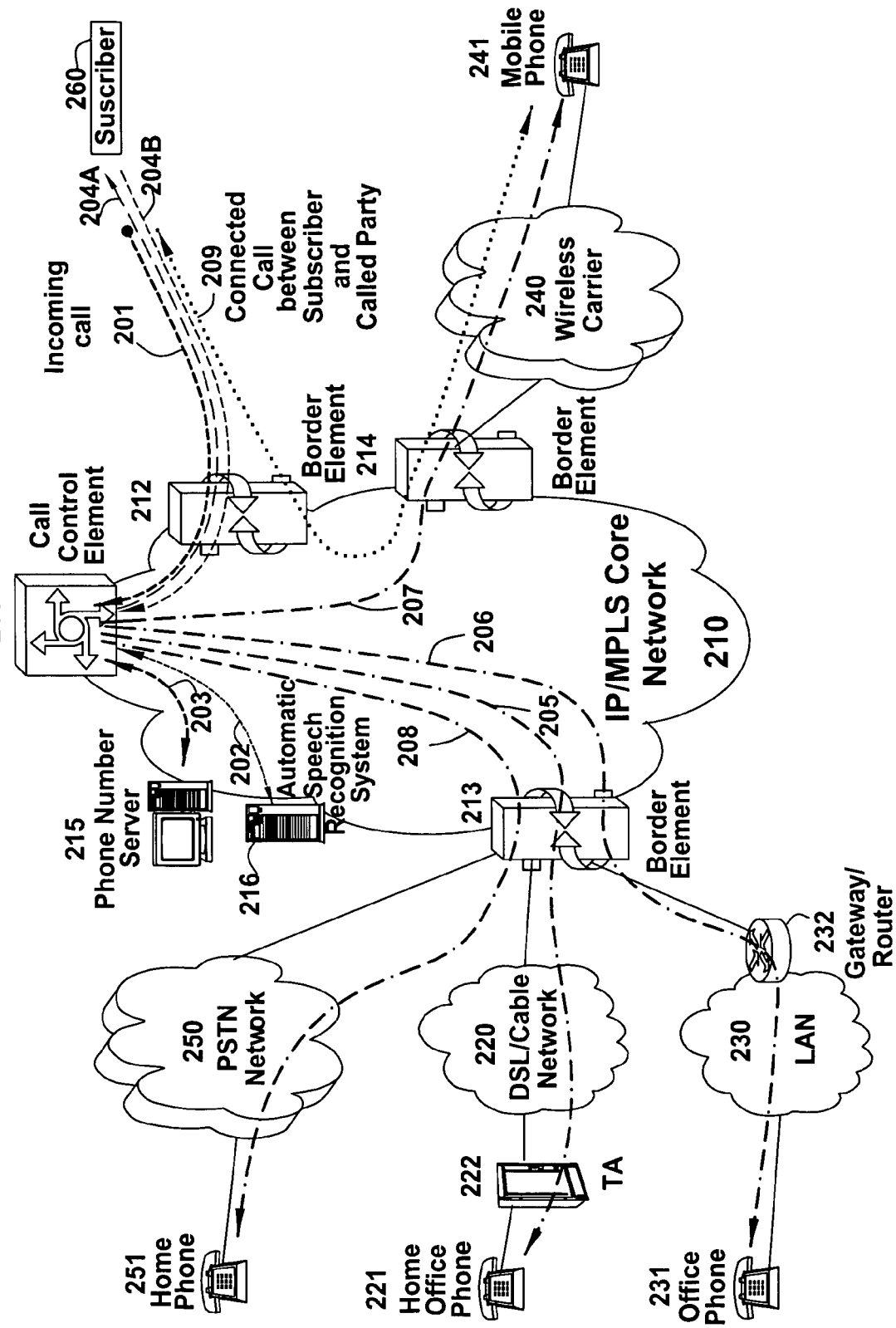
FIG. 2 illustrates an example of a network based phone number dialing using email addresses service of the present invention.

FIG. 2 illustrates an example of the network based phone number dialing using an email address service. The example is illustrated in an IP/MPLS Core Network 210 using a sequence of events 201 to 209, in time, where steps 202, 204A, and 204B are optional. A subscriber subscribes to the network based "phone number dialing using an email address" service, enabling the subscriber to register associations between email addresses and associated phone numbers. In other words, the subscriber configures a directory comprising a mapping between respective email addresses associated with contacts that the subscriber may attempt to call and the phone numbers (e.g., home phone number, home office phone number, office phone number, mobile phone number, and the like) associated with the contacts.

Then, subscriber 260 (calling party) attempts to establish a call with a contact (a called party) using the contact's email address. The network receives an incoming communication request (call) from the subscriber 260. The call enters the network via BE 212 and BE 212 sends CCE 211 a SIP call setup signaling message. This event is shown as 201 in FIG. 2. The CCE 211 processes the call to determine the called party's email address, and interacts with phone number server 215 to retrieve the necessary information, such as a list of phone numbers and associated service logic associated with the called party's email address. Namely, server 215 can simply be a VoIP related server that is tasked with handling the "phone number dialing using an email address" services of the present invention. This event is shown as 203 in FIG. 2.

In one embodiment, in which the email address provided by the subscriber is received as a speech input (i.e., the email address is spoken by the subscriber rather than being input using a keyboard, using Dual Tone Multiple Frequency (DTMF) signaling, and the like), before event 203 CCE 211 provides the input speech representation of the email address to automatic speech recognition system (ASRS) 216. The ASRS 216 processes the input speech, converting the input speech representation of the called party's email address to a data representation of the called party's email address. The data representation of the called party's email address is then returned to the CCE 211 for use in determining the phone numbers associated with the called party's email address (as specified in event 202). This optional event is shown as event 202 in FIG. 2.

In one embodiment, the CCE 211 optionally creates a network announcement for the subscriber, where the network announcement comprises the at least one phone number associated with the called party's email address (provided to CCE 211 by server 215). In one such embodiment, the network announcement simply provides the subscriber with the phone numbers associated with the called party email address. In another such embodiment, the network announcement provides the subscriber an option to establish the call with the called party using at least one of the phone numbers associated with the called party. For example, as a portion of the network announcement, the subscriber may be prompted to select one phone number to call (e.g., CCE 211 generates an audio message such as "press or say 1 to dial the home phone number; press or say 2 to dial the office phone number"). This event is shown as optional event 204A in FIG. 2.

In one embodiment, in which the network announcement comprises an option for enabling the subscriber to select a phone number for establishing the call with the called party, the subscriber may select at least one of the phone numbers specified in the network announcement using various user entry means (e.g., speech input, text input, DTMF signaling, and like user entry means). Upon receiving the user input from the subscriber in response to the network announcement, CCE 211 may call the called party phone number(s) specified by the subscriber in response to selection by the subscriber of the option to establish the call. In one such embodiment, the subscriber may have an option to ring all called party phone numbers associated with the email address simultaneously. This event is shown as optional event 204B in FIG. 2.

In one embodiment, in which the subscriber has configured the service to call the home phone number, the home office phone number, the office number, and the mobile phone number simultaneously, the CCE 211 follows the configured service logic and continues the call processing by sending SIP signaling messages to endpoint devices 221, 231, 241, and 251 simultaneously. In one embodiment, the CCE 211 may send SIP signaling messages to endpoint devices 221, 231, 241, and 251 simultaneously using input from the subscriber in response to a network announcement (e.g., an audio menu prompt such as: "press * to ring all phone numbers simultaneously"). The call processing flows for endpoint devices 221, 231, 241, and 251, are shown as events 205, 206, 207, and 208 respectively.

If the called party answers with the called party's mobile phone 241, the CCE 211 completes the call between the subscriber 260 and device 241, as shown in event 209 in FIG. 2. The call processing flows for endpoint devices 221, 231, and 251 are then terminated. It should be noted that a service provider, e.g., AT&T, may operate the IP/MPLS core network 110 and/or one or more of the access networks as described above. Furthermore, the number of networks, and/or components (e.g., BE, CCE, and VoIP related servers) within each network is provided only as an example. Thus, greater or lesser number of networks, and/or components can be deployed in a particular communication system or architecture.

Figure 3:
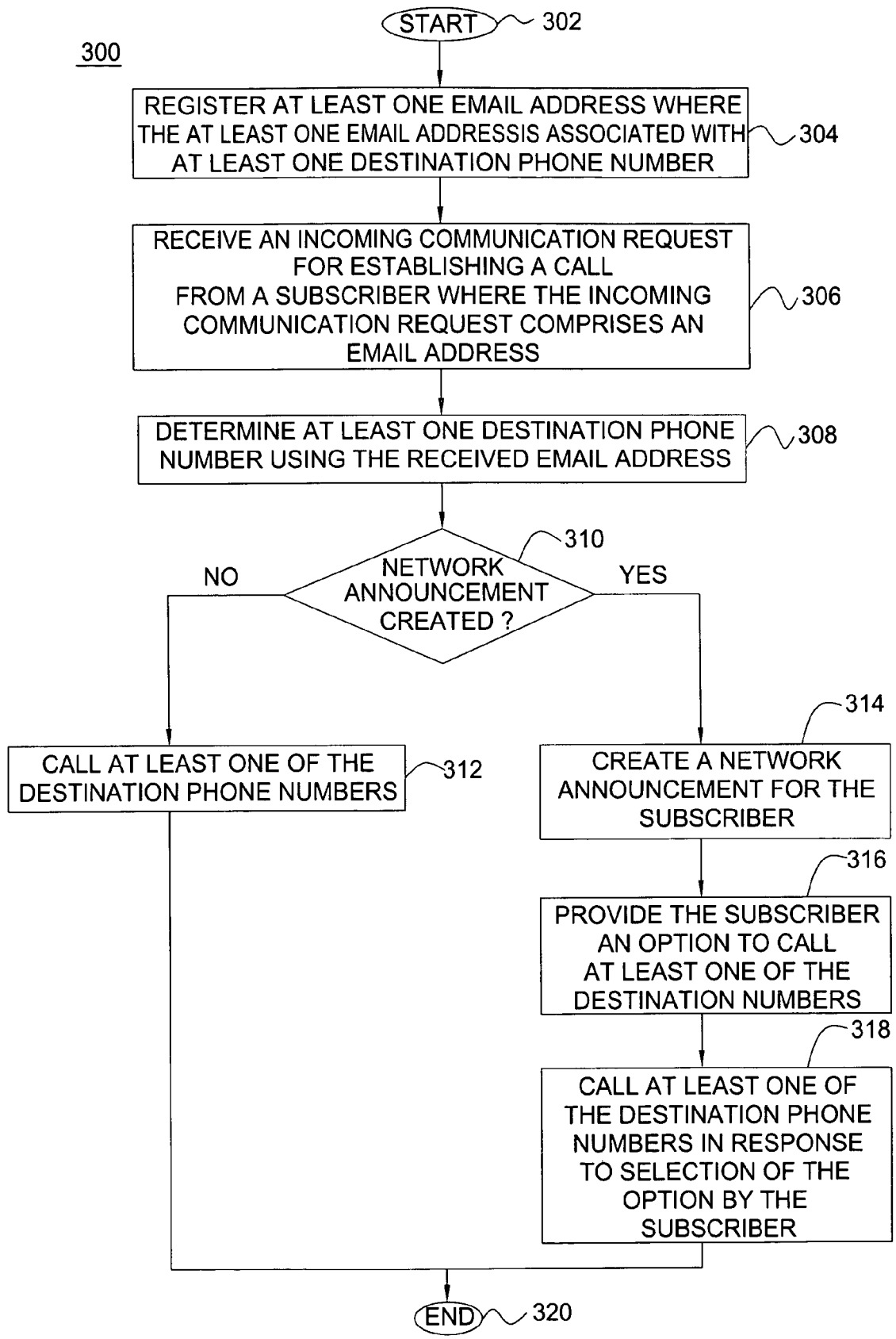
FIG. 3 illustrates a flowchart of a method for enabling a subscriber to establish a call to at least one destination phone number.

FIG. 3 illustrates a flowchart of a method for enabling a subscriber to establish a call to at least one destination phone number. Although depicted as being performed serially, those skilled in the art will appreciate that at least a portion of the steps of method 300 may be performed contemporaneously. The method 300 is entered at step 302 and proceeds to step 304. At step 304, at least one email address is registered with the network by a subscriber, where each registered email address comprises at least one associated destination phone number. In one embodiment, the registration of the mapping from email addresses to destination phone numbers is maintained by phone number server 215. At step 306, an incoming communication request (for establishing a call between the subscriber and a called party) is received. In one embodiment, the incoming communication request comprises an email address of the called party. The email address may be entered using voice input, text input (e.g., via a keyboard), DTMF signaling, and the like.

At step 308, at least one destination phone number is determined using the received email address. In one embodiment, the at least one destination phone number is determined by querying the server 215 using the email address associated with the called party. In another embodiment, in which the email address is received as speech input, the at least one destination phone number associated with the email address is determined using speech recognition processing (e.g., by converting the speech input to data input using ASRS 216).

At step 310, a determination is made as to whether a network announcement is created. In one embodiment, a network announcement may comprise an audio announcement generated by the network for providing information (e.g., destination phone numbers associated with the email address) to the subscriber. If a network announcement is not created, method 300 proceeds to step 312. If a network announcement is created, method 300 proceeds to step 314.

At step 312, at least one of the destination phone numbers associated with the email address is called using standard call completion processing as known in the art. In one embodiment, calls may be initiated to all destination phone numbers contemporaneously. In another embodiment, a call may be initiated to a preferred destination phone number. In still another embodiment, calls may be initiated to all destination phone numbers serially according to a priority associated with each destination phone number. The method 300 then proceeds to step 320 where method 300 ends.

At step 314, a network announcement is created for the subscriber in response to determination of the destination phone numbers associated with the called party's email address. At step 316, the subscriber is provided with an option to call at least one of the destination phone numbers associated with the called party's email address. At step 318, at least one of the destination phone numbers is called in response to selection of the option by the subscriber. The method 300 then proceeds to step 320 where method 300 ends.

Figure 4:
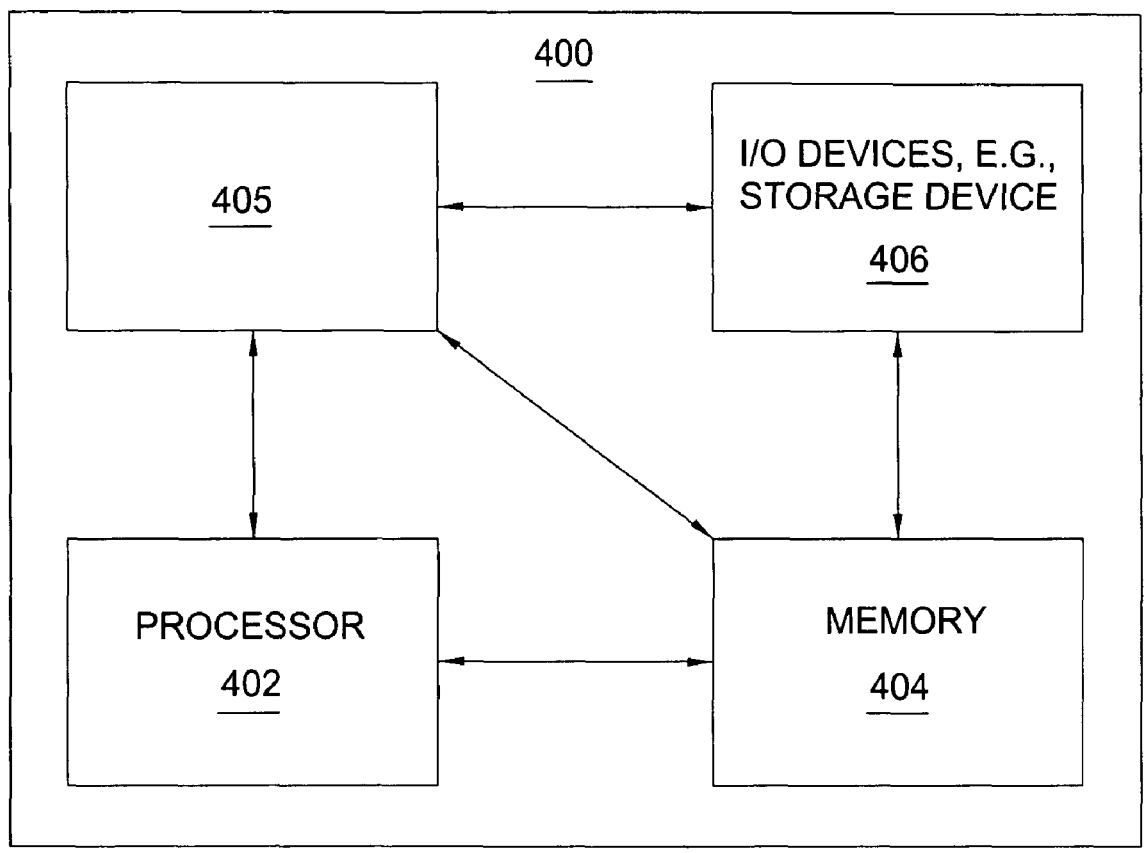
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a directory service module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present directory service module or process 405 can be loaded into memory 404 and executed by processor 402 to implement the functions as discussed above. As such, the present directory service process 405 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for enabling a subscriber to establish a call to a destination phone number, comprising:
    registering an email address with a communication network by the subscriber, wherein the registering comprises associating the email address with the destination phone number;
    receiving by a call control element an incoming communication request from the subscriber for establishing the call, the incoming communication request comprising the email address;
    determining by the call control element the destination phone number associated with the email address; and
    processing by the call control element the call using the destination phone number associated with the email address, wherein the processing comprises:
        creating a network announcement for the subscriber, the network announcement comprising the destination phone number, wherein the network announcement comprises an audio message;
        providing the subscriber an option to establish the call using the destination phone number; and
        calling the destination phone number in response to a selection by the subscriber of the option for establishing the call.

2. The method of claim 1, wherein the email address is received as a speech input.

3. The method of claim 1, wherein the determining the destination phone number associated with the email address is performed using speech recognition.

4. The method of claim 1, wherein the selection of the option to establish the call is performed using a speech input.

5. The method of claim 1, wherein the email address is received as a text input.

6. The method of claim 1, wherein the email address is received as a dual tone multiple frequency signal input.

7. The method of claim 1, wherein the selection of the option to establish the call is performed using a dual tone multiple frequency signal input.

8. The method of claim 1, wherein the selection of the option to establish the call is performed using a text input.

9. A non-transitory computer readable storage medium storing a software program, that, when executed by a computer, causes the computer to perform a method comprising:

registering an email address with a communication network by the subscriber, wherein the registering comprises associating the email address with the destination phone number;

receiving an incoming communication request from the subscriber for establishing the call, the incoming communication request comprising the email address;

determining the destination phone number associated with the email address; and processing the call using the destination phone number associated with the email address, wherein the processing comprises:

creating a network announcement for the subscriber, the network announcement comprising the destination phone number, wherein the network announcement comprises an audio message;

providing the subscriber an option to establish the call using the destination phone number; and calling the destination phone number in response to a selection by the subscriber of the option for establishing the call.

10. The non-transitory computer readable storage medium of claim 9, wherein the email address is received as a speech input.

11. The non-transitory computer readable storage medium of claim 9, wherein the determining the destination phone number associated with the email address is performed using speech recognition.

12. The non-transitory computer readable storage medium of claim 9, wherein the selection of the option to establish the call is made using a speech input.

13. The non-transitory computer readable storage medium of claim 9, wherein the email address is received as a dual tone multiple frequency signal input.

14. The non-transitory computer readable storage medium of claim 9, wherein the email address is received as a text input.

15. The non-transitory computer readable storage medium of claim 9, wherein the selection of the option to establish the call is made using a dual tone multiple frequency signal input.

16. The non-transitory computer readable storage medium of claim 9, wherein the selection of the option to establish the call is performed using a text input.

17. An apparatus for enabling a subscriber to establish a call to a destination phone number, comprising:

a processor; and a computer-readable medium in communication with the processor, the computer-readable medium having stored thereon a plurality of instructions, the plurality of instructions including instructions which, when executed by the processor, cause the processor to perform a method comprising:

receiving an incoming communication request from the subscriber for establishing the call, the incoming communication request comprising an email address, wherein the email address was previously registered with a communication network by the subscriber to associate the email address with the destination phone number;

determining the destination phone number associated with the email address; and processing the call using the destination phone number associated with the email address, wherein the processing comprises:

creating a network announcement for the subscriber, the network announcement comprising the destination phone number, wherein the network announcement comprises an audio message;

providing the subscriber an option to establish the call using the destination phone number; and calling the destination phone number in response to a selection by the subscriber of the option for establishing the call.

18. The apparatus of claim 17, wherein the determining the destination phone number associated with the email address is performed using speech recognition.

19. The apparatus of claim 17, wherein the incoming communication request is received as a text input.

20. The apparatus of claim 17, wherein the incoming communication request is received as a dual tone multiple frequency input.

* * * * *